United States Patent [19]

Baxter

[11] 3,896,784
[45] July 29, 1975

[54] CAMPING STOVE
[75] Inventor: Allan Baxter, Bromley, England
[73] Assignee: Allanter Instruments Limited, Bromley, England
[22] Filed: Aug. 14, 1973
[21] Appl. No.: 388,166

[30] Foreign Application Priority Data
Aug. 23, 1972 United Kingdom............... 39162/72
Sept. 21, 1972 United Kingdom............... 43663/72
Dec. 19, 1972 United Kingdom............... 58530/72

[52] U.S. Cl..................... 126/38; 126/9 R; 126/40; 126/44
[51] Int. Cl. .............................................. F24c 5/20
[58] Field of Search.................. 126/38, 44, 9 R, 40; 220/4 E

[56] References Cited
UNITED STATES PATENTS
3,140,740 7/1964 Lagreid et al.......................... 126/44
3,252,568 5/1966 Steidinger ........................... 220/4 E
3,648,680 3/1972 Hein ....................................... 126/38

FOREIGN PATENTS OR APPLICATIONS
237,285 2/1962 Australia............................. 126/44

*Primary Examiner*—Carroll B. Dority, Jr.
*Attorney, Agent, or Firm*—Fleit & Jacobson

[57] ABSTRACT

A camping stove comprising a base, a pan support, a gas burner and an air/gas mixture tube which is alternatively arrangeable in an operative assembled condition and a compact demounted condition for travelling or storage. Means are provided for interconnecting the base and pan support in the demounted condition whereby they form a closed casing containing and protecting the burner unit and mixture tube.

13 Claims, 13 Drawing Figures

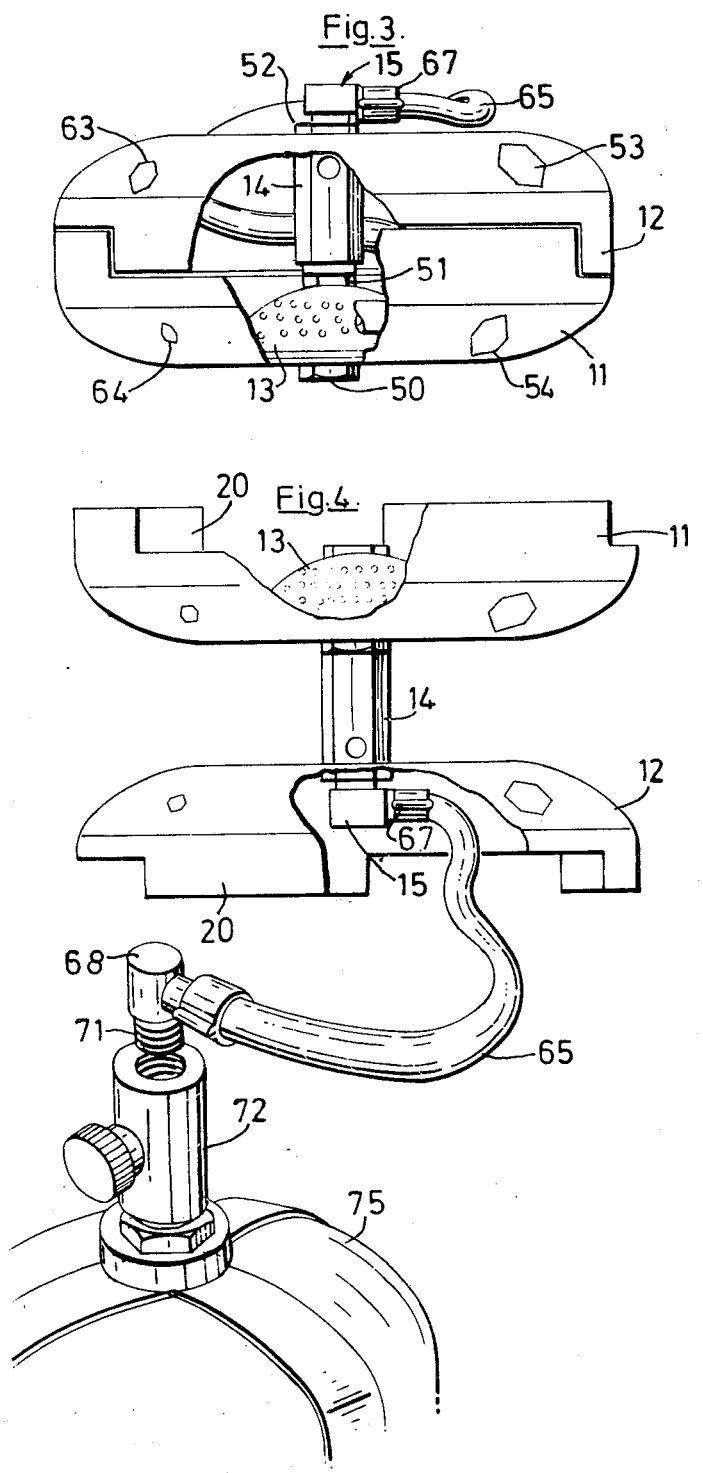

PATENTED JUL 29 1975 3,896,784
SHEET 3
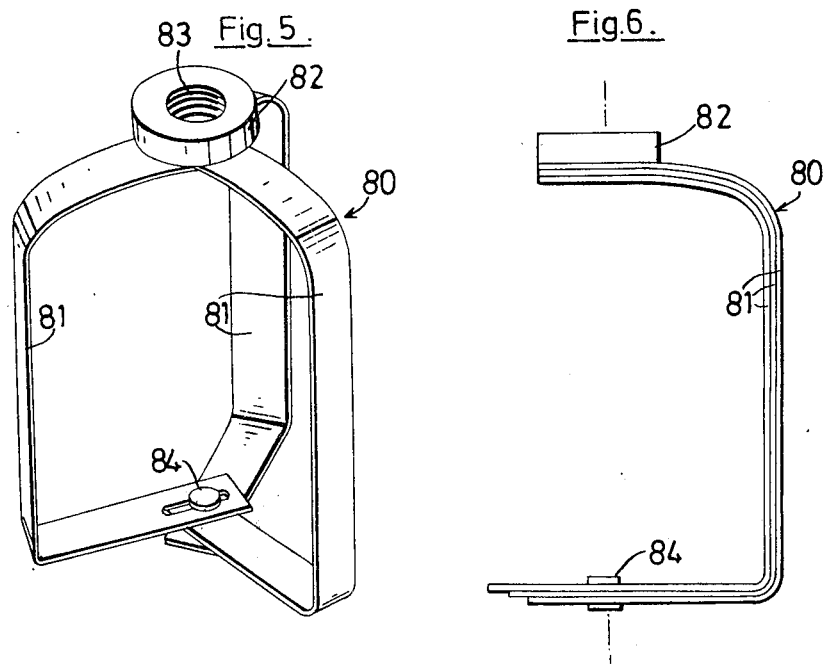
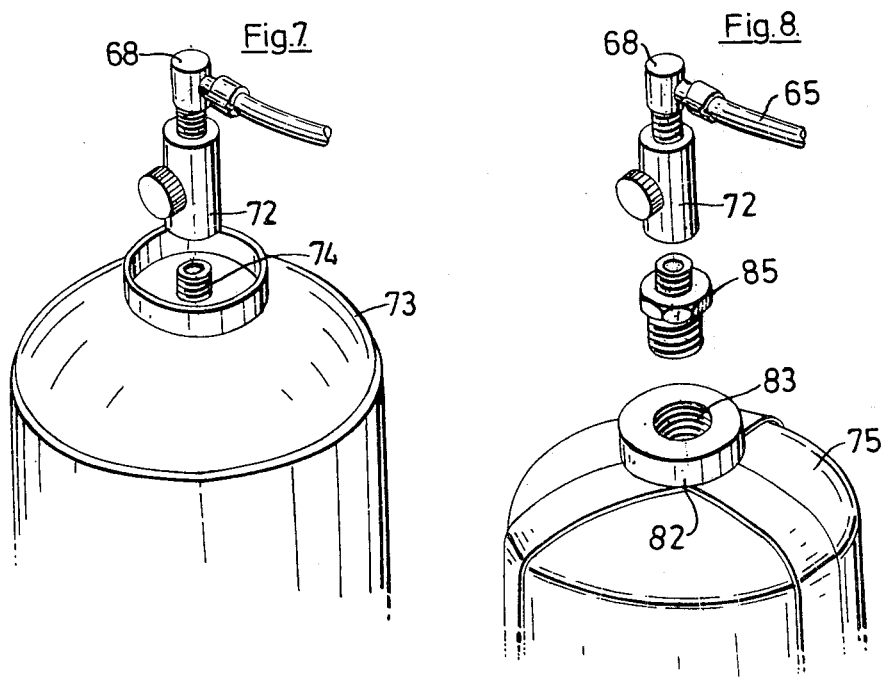

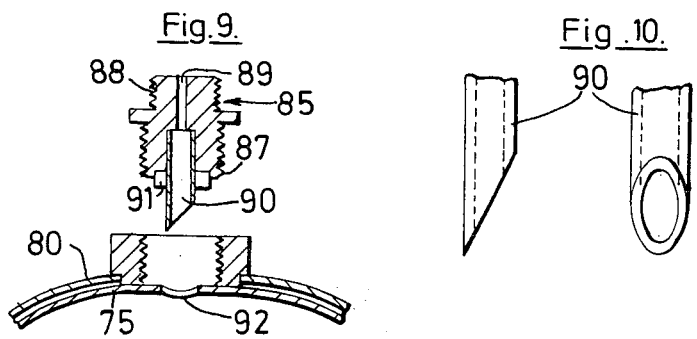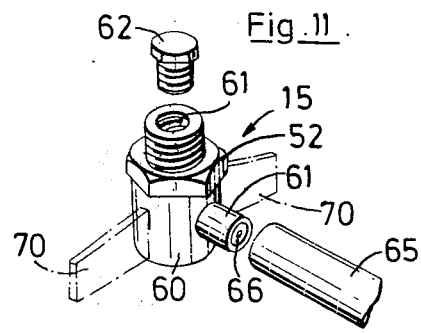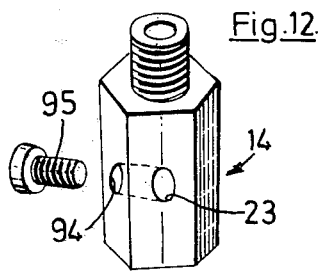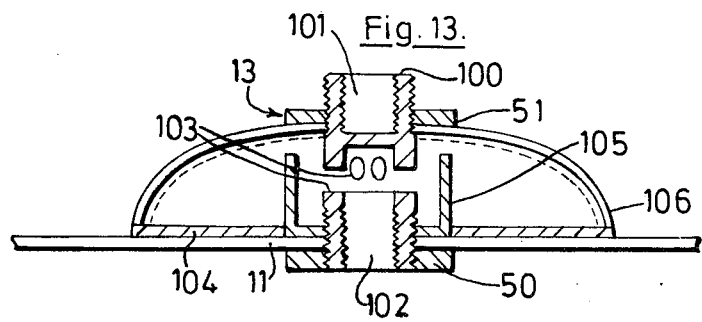

CAMPING STOVE

The present invention relates to a camping stove, more particularly to a portable liquid gas burning camping stove.

According to one aspect of the present invention there is provided a camping stove comprising a pan support, a base member, a burner unit, an air/gas mixture tube and a gas jet, the components of the stove being alternatively arrangeable in an assembled condition in which, when the burner is supported upon its base, the pan support is adapted to support an article to be heated, and a demounted condition in which the pan support and the base member together form a closed casing containing and protecting from damage the burner unit, the air/gas mixture tube and the gas jet which are themselves interconnectable with each other when the stove is demounted to prevent them from being displaceable within the casing.

Preferably the pan support and the base member are each of a generally bowl shape with the rims thereof castellated so that in the collapsed state of the stove, the castellations interfit with each other thereby making the overall unit more compact. The burner unit may be secured to the centre of the pan support which also serves as a windshield.

Any simple means may be used to join the two parts of the casing together when the stove is collapsed and conveniently this may be done by a combined jet and gas supply pipe fitting which has a threaded portion which when inserted through one of the casing parts screws into a threaded bore in the mixture tube, the combined fitting being mounted on the outside of the casing with the gas jet located within the fitting.

In order to prevent the parts of the stove from being lost and from rattling inside the casing, the stove is made so that all the parts are secured together both in its assembled and collapsed state. In order to do this the burner unit is secured, for example by riveting, within the dished portion of the pan support. The burner unit has corresponding threads tapped into both ends thereof and in the case of the tapped hole in the underside of the burner unit, which is accessible from the outside of the pan support, this provides communication in the use of the stove for the gas/air mixture from the mixture tube to the burner unit. The other tapped hole in the burner unit is a blind bore. The mixture tube has an external thread on a turned-down portion at one end thereof and has an internal thread inside the other end of the tube bore, both the external and internal threads are of the same type and correspond with those in the burner unit. Finally, the jet portion of the combined jet and gas supply fitting has an external thread thereon which is the same as the others. In order to assemble the stove, the mixture tube is screwed by its externally threaded portion into the threaded portion in the underside of the burner unit, the base member is positioned over the free end of the mixture tube so that its dished portion faces away from that of the pan support which is secured to the burner unit and the combined jet and gas supply fitting is passed through a centrally disposed aperture in the base member and is screwed into the internal thread of the mixture tube. In the assembled state of the stove a source of gas, conveniently butane gas, is coupled to the combined fitting via a flexible hose.

In order to collapse the camping stove the reverse procedure is adopted and in order to pack the parts together for carriage the mixture tube is screwed into the blind bore of the burner unit and the base member is placed rim to rim with the pan support over the free end of the mixture tube and the combined jet and gas supply fitting is screwed from outside of the pan support into the threaded bore of the mixture tube. In this state the unit is compact and each of the parts is securely joined to the other so that they cannot rattle about and furthermore each of the parts is protected from damage. It should be noted that as the thread on the combined jet and gas supply pipe fitting is around the jet portion, so that when the stove is assembled in its collapsed or demounted state the jet outlet is protected because it is located within the bore of the mixture tube which itself is located within the assembled casing. The overall dimensions of the casing are selected so that in its collapsed state the stove can conveniently be carried in the pocket of a rucksack or anorak or, if the stove is used as an occasional stove for picnics, it can be conveniently stored in the glove compartment of a motor car. If necessary a suitable valve may be incorporated upstream of the jet to control the flow of gas into the stove. Preferably, however the stove is used with a gas supply container having its own valve or can be fitted with a valve for controlling the flow of gas to the stove. The advantage of this latter arrangement is that the user does not have to place his or her hand under a heated utensil to control the gas flow. Additionally, another advantage of having a separate gas supply and control valve is that the stove can be designed with a lower pan support and as a result the stove will have a lower centre of gravity which ensures a greater stability and safety.

According to another aspect of the present invention there is provided a piercing device for extracting fluids from thin walled containers, comprising a generally cylindrical body having an axially extending bore therein which opens into an end surface of the body and a tubular piercing member mounted so as to protrude from the other end surface of the body and with the bore of the piercing member communicating with that in the body.

According to a further aspect of the present invention there is provided a holder for non-resealable liquid gas containers, comprising a plurality of straps, each shaped to conform to the external surface of the type of container to which the holder is to be fitted, the straps being so coupled together at their ends that they are movable relative to each other to form a cage about a gas container placed in the spaced defined by the straps.

Embodiments of the present invention will now be described, by way of example, with reference to the accompanying drawings, in which:

FIGS. 3 and 4 show an alternative embodiment of the invention with the stove in its collapsed state and its assembled, ready for use, state, respectively, with portions of the casing broken away;

FIG. 5 shows diagrammatically a three arm holder suitable for use with a liquid gas container of the type which has to be perforated to release the gas therefrom;

FIG. 6 is a side elevation view of the holder in its collapsed state with the three arms thereof fitted one within the other;

FIG. 7 is a perspective view illustrating a means for coupling the stove to a resealable liquid gas container;

FIG. 8 shows a means for fitting a perforating device and valve to a liquid gas container of the type which has to be perforated and is not resealable;

FIG. 9 is a cross-sectional view through a perforating device;

FIG. 10 illustrates two orthogonal views of the end of the perforator device tube;

FIG. 11 is a partially exploded view of a jet and gas supply pipe fitting;

FIG. 12 is a perspective view showing a modified mixture tube having means for controlling the air flow, and FIG. 13 is a cross-sectional view through a demountable burner unit.

Figure 1:
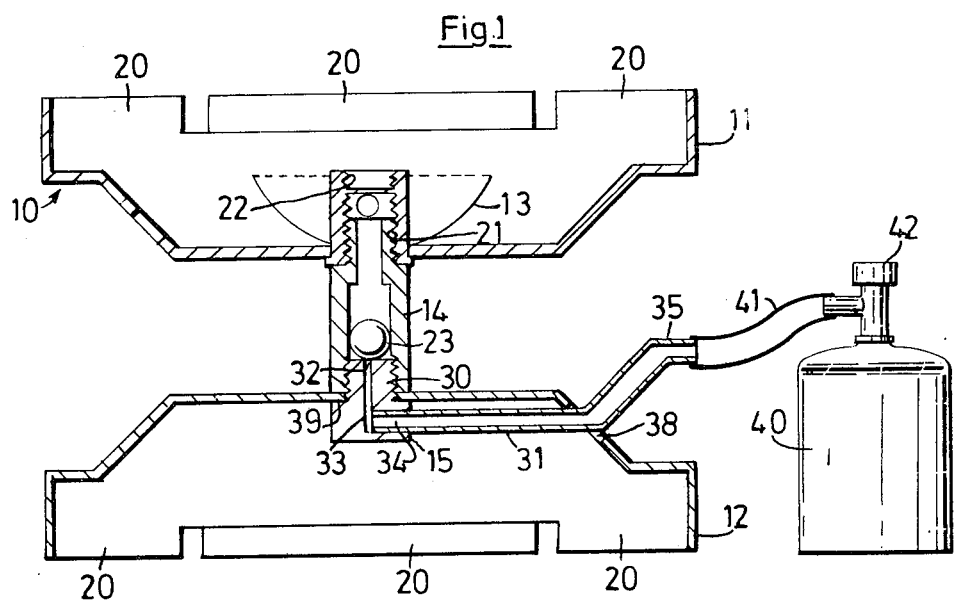
FIG. 1 shows an elevation in cross-section through one embodiment of the stove in its assembled state.

Referring to the drawings, the stove 10 comprises five metallic parts: a generally concave pan support 11, a similarly shaped base member 12, both of generally circular cross-section, a burner unit 13 which includes a diffuser, secured for example by riveting to the pan support 11 as shown, a mixture tube 14 and a combined jet and gas supply pipe fitting 15.

Figure 2:
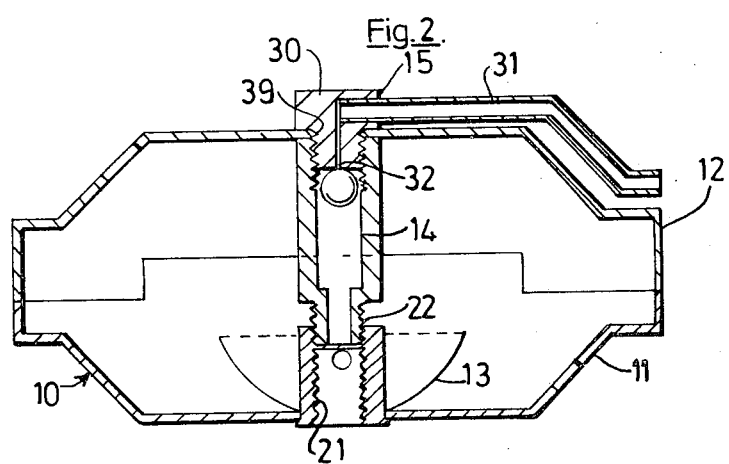
FIG. 2 shows a cross-section through the stove of FIG. 1 in its collapsed state.

The pan support 11 and the base 12 are preferably identical in shape and have castellations 20 formed therein so that as shown in FIG. 2, when the pan support 11 and the base 12 are placed rim to rim then the castellations interfit with one another to form a compact casing which effectively protects the parts disposed within the casing. Although the rims of the pan support 11 and base member 12 have been shown as being castellated, any suitable finish may be provided around the rims of the pan support 11 and the base member 12 but it is preferred to have three castellations on each part so that each forms a three-point support.

The burner unit 13 which may be of any suitable design has opposed bores or apertures 21 and 22 therein. In the case of the bore 21 this communicates with the interior of the burner unit whilst the bore 22 is a blind bore. Corresponding threads are formed on the inside of each bore 21 and 22.

The mixture tube 14 is a length of tube having transverse bores 23 for the entry of air to be mixed with gas admitted to the base of the bore through the unit 15. The outer surface of one end of the mixture tube is turned down and has an external thread thereon whilst at the other end of the tube an internal thread is provided inside the wall of the tube bore, both the external and internal threads correspond with each other and with the threads in the bores or apertures 21 and 22 of the burner unit.

The jet and gas supply pipe fitting 15 comprises two parts namely a jet member 30 and a gas supply pipe 31. A jet 32 is mounted in one end of the jet member 30 which communicates through a bore 33 with a transversely extending bore 34 of the pipe 31 which is secured, for example by brazing or soldering, to the jet member 30. The pipe 31 has its free end 35 cranked away from the point of attachment with the jet member and preferably the general shape of the tube is arranged to conform with the external surface of the base member as is more clearly shown in FIG. 2.

In order to assemble the stove the mixture tube 14 is screwed into the bore 21 of the burner unit, the base member 12 is then arranged with its dished portion pointing away from that of the pan support and the pipe 31 of the fitting 15 is threaded through an aperture 38 in the base member 12 so that the jet member 30 of the fitting 15 can be inserted through a central aperture 39 in the base unit 12 and can be screwed into the internally threaded bore of the mixture tube 14. A gas bottle 40, which has only been shown diagrammatically and not to scale, is connected to the free end 35 of the pipe 31 through a flexible hose 41. The stove is then ready for use.

In order to dismantle the stove, a valve 42 of the cylinder 40 is turned off and the flexible hose 41 is disconnected from the free end 35 of the pipe 31. The fitting 15 is first unscrewed from the mixture tube 14 and when this has been done the base member 12 and the fitting 15 are separated from each other. The mixture tube 14 is then unscrewed from the burner unit 13. If these two parts are somewhat tightly screwed together then the pipe 31 which is of smaller external diameter than the air hole 23 in the tube 14 is inserted into the hole 23 and can act as an extension or tommy bar for releasing the mixture tube 14.

In order to reassemble the stove in a collapsed or transit state, the externally threaded portion of the mixture tube 14 is screwed into the blind bore 22 of the burner unit 13 as shown in FIG. 2. The base member 12 is arranged rim to rim with the pan support 11 and the jet member 30 of the combined fitting 15 is inserted through the aperture 39 in the base member and is screwed into the internally threaded portion of the mixture tube 14. As shown in FIG. 2 all the vulnerable parts of the stove namely the burner unit 13, the mixture tube and the jet 32 are arranged within the casing and are protected from damage.

Other apertures may be provided in the pan support, as required, in order to stabilize the flame from the burner unit 13.

If desired a gas regulating valve may be provided upstream of the jet. Conveniently the unit 15 is modified to accept such a valve, which may comprise separate subassembly in the gas supply path upstream of the jet.

The second embodiment of the present invention incorporates modifications of the first embodiment which not only simplify the manufacture of the stove but also enable it to be cleaned, particularly in the case of the spillage of liquid such as soup which can block the apertures in the burner unit 13. At the same time, in order to enable the stove to be used with a variety of liquid gas containers, such as resealable containers sold under the names TAYMAR RF 80 and RF 89, TILLEY GO-GAS 6BU, CALOR-PRIMUS 2202 and PARASENE 6 ounce, and those containers which are not resealable and which are sold under the names of CAMPING GAZ 200 and VERITAS G.1599 which have to be pierced, a valve/piercer assembly and a container holder have been devised to enable the gas container to be safely disconnected from the stove after use so that the latter can be demounted and collapsed somewhat in the manner as described with reference to FIGS. 1 and 2 and for the container to be stored separately.

Referring to FIGS. 3 and 4 in which corresponding reference numerals have been used to indicate those parts corresponding to those shown in FIGS. 1 and 2.

In this embodiment the pan support 11 and the base member 12 are of generally concave form having castellations 20 formed in the peripheries thereof. In order to facilitate the demounting and assembly of the various parts of the stove the mixture tube 14 is made of hexagon bar and the various nuts 50, 51 and 52 have the same cross-sectional shape and size as the hexagon bar of the mixture tube. To assist in the tightening or loosening of the mixture tube 14 or the various nuts 50, 51 and 52, hexagonal apertures of a size corresponding to that of the cross-section of the mixture tube are formed in the pan support 11 and the base member 12 so that either may be used as a spanner. A further difference between the first and second embodiments is that the combined jet and gas supply pipe fitting 15 is of a different form comprising a generally cylindrical member 60 (FIG. 11) having a blind aperture 61 therein and an external thread thereon to receive the nut 52 which acts as a lock nut. The blind aperture 61 has a thread cut therein which receives a jet 62. The jet has a hexagonal head in order that the spanner may be applied to the head to remove the jet for cleaning or replacement. For the sake of convenience further hexagonal apertures 63, 64 are formed in the pan support 11 and base member 12, respectively. In order to couple a flexible hose connector to the fitting 15 a short length of metal tubing 66 is attached to the member so as to communicate with the blind aperture 61. It has been found that if the connector hose 65 which is usually of neoprene rubber is secured directly to the tubing 66 there is a tendency after prolonged use of the stove for the end of the pipe 65 to deteriorate due to the effects of the heat generated during the use of the stove. In order to overcome this disadvantage either the tubing 66 can be made of a heat resistant material such as a fine grade of tufnell or a short sleeve 67 of a silicone rubber can be inserted over the tubing 66 and the neoprene rubber tubing 65 inserted over the silicone rubber sleeve 67 and clamped thereto by an aluminum fixing device 67 which is crimped onto the end of the pipe 65 when in position. A threaded connector device 68 is attached to the other end of the hose 65, this device is similar in construction to the fitting 15 but does not include a gas jet. Since the connector device 68 is not exposed to a heat from the stove to anywhere near the same degree as the fitting 15 the tubing 65 can be clamped directly onto a tubular metal stem extending from the fitting 68.

If desired the fitting 15 may be formed as a wing nut by having a pair of diametrically opposed wings 70 attached to the member 60 as shown in broken lines in FIG. 11. By the fitting being formed as a wing nut then it can be tightened more securely both in the assembled and demounted states of the stove.

In order to enable the stove to be used with as many different types of liquid gas containers as possible the fitting 68 has a threaded end 71 (FIG. 4), which thread is different from that on the fitting 15 in order to ensure that the two ends cannot be incorrectly connected. The threaded end 71 of the fitting 68 is engageable with an internally threaded aperture in a valve 72 which has a further internally threaded aperture (not shown) in the opposite end thereof. In the case of using the stove with a resealable container 73 (FIG. 7) having a threaded bushing 74 thereon. The valve 72, which may include a needle (not shown) for actuating the seal in the valve assembly of the container 73, is screwed onto the bushing 74 so that the valve assembly of the container is opened. As the valve 72 is maintained shut the gas cannot escape. Having set up the stove as shown in FIG. 4 then the connector is attached to the valve 72 and the stove is ready for use with the supply of gas being controlled by the valve 72. By such an arrangement it is possible to remove the valve 72 after use and store the container 73 separately.

In order to be able to use the stove with a non-resealable container 75 of the type known as Camping Gaz 200 and Veritas G1599 a holder 80 (FIGS. 5 and 6) has been devised which enables the non-resealable container once perforated, to be used with a valve 72 which controls the supply of gas from the container. The holder comprises three metal straps 81 which are shaped to generally conform with the outer surface of the gas container 75 to which the holder is to be fitted. One end of the straps 81 are attached to and movable about a bush 82 which has a threaded aperture 83 to receive a piercer 85 (FIGS. 8 and 9). The other end of the straps 81 are slotted and are coupled together by means of a fixing device 84 such as a double headed rivet 84 which is a clearance fit in the slots. In its storage condition of the holder as shown in FIG. 6 the three straps 81 are arranged one within the other with the lower ends thereof staggered as permitted by the rivet 84 in the slots in the straps. The dimensions of the holder in its collapsed position are such that it can be readily stored within the casing formed by the pan support 11 and the base member 12 in their demounted condition as shown in FIG. 2 or 3. When fitting the holder around a container the straps are first rotated to form a sector of 180° or less and the container 75 is inserted into the space defined by the straps 81 thereafter the straps are further displaced so that each one is approximately 120° from the other with the bush 82 disposed immediately above a dimple 92 (FIG. 9) formed in the container 75 itself. In this condition the container is ready to be punctured by the piercer 85. The piercer 85 comprises a hexagonal bushing of the same cross section and size as the mixture tube 14 having an external thread 87 which co-operates with that in the bushing 82 of the holder 80 on one end thereof and a second external thread 88 corresponding to the thread of the valve assembly 72 at the other end thereof. A small diameter hole is bored coaxially through the bushing from the smaller diameter end for part of the way through. This aperture communicates with the bore of a stainless steel tube 90 which extends into and is secured within a suitable shaped bore in the other end of the piercer 85. As shown in FIG. 10 the end of the stainless steel tube 90 is cut at an angle and acts as a piercing device. A compressible seal 91 is provided around the stainless steel tube 90.

In use when it is desired to puncture a container 75 the holder 80 is disposed about the container as described above. The piercer is screwed into the valve 72 as tightly as possible, the valve being closed. Whereafter the piercer 85 is screwed into the threaded bush 82 of the holder 80 and as the end of the stainless steel tube 90 engages the dimple 92 in the container 75 it describes a circle having the diameter of the tube 90 and by continued screwing of the piercer 85 the tapered end of the tube 90 punctures the tin and by continued screwing of the piercer 85 the seal 91 is compressed against that part of the container surrounding the hole and forms a fluid tight seal. In this condition assuming that the stove is erected, the fitting 68 on the end of the hose 65 can be coupled to the valve 72 so that the stove is ready for use. After use, the valve 72 is turned off and the fitting 68 is removed from the valve 72. The valve piercer assembly is maintained in position on the holder thereby preventing the loss of fluid from the container 75. As the container is effectively sealed by the valve 72 it can be stored separately from the stove.

If it is desired to regulate the air supply through the air holes 23 extending radially from the bore extending axially through the hexagonal mixture tube 14, a second aperture 94 (FIG. 12) is drilled from an adjacent face of the hexagonal tube so as to intersect with the air holes 23. A screw 95 is engageable in a thread cut in the aperture 94 and by governing the degree of insertion of the end of the screw 95 into the air holes 23 the amount of air passing through the air holes 23 can be regulated.

Another feature of this second embodiment of the invention is the provision of a demountable burner unit 13 which is shown in FIG. 13 of the drawings. The burner unit 13 comprises an elongate member of generally circular cross-section having opposed blind apertures 101 and 102 bored therein from opposite ends thereof. The diameters of the apertures 101 and 102 are identical and corresponding threads are cut within the apertures 101 and 102, these threads are of the size and type of the thread corresponding to the external thread on the end of the mixture tube 14. External threads of corresponding type are cut on the outside of the elongate member 100 onto which the nuts 50 and 51 can be threaded. In the aperture 102 of the elongate member 100 a number of radially extending gas distributing holes 103 are provided. In order to assemble the burner unit 13 the elongate member 100 with only the nut 50 thereon is threaded through an aperture in the pan support 11 from the outer side thereof. A compressible heat resistant washer 104 having a central aperture is placed on the elongate member 100 and contacts the inner surface of the pan support 11. A gas deflector member 105 in the form of a cylinder provided with a base at one end is disposed concentrically about and threaded at its base on the elongate member 100. The cylindrical portion of the gas deflector member 105 has an internal diameter greater than that of the elongate member 100 and is spaced therefrom. A generally concave diffuser gauze having an outer diameter less than that of the heat resistant washer 104 and having a centrally disposed aperture corresponding to the outer diameter of the elongate member 100 is positioned about the elongate member 100 as shown. A generally concave, burner body 106 having an external diameter not exceeding that of the heat resistant washer 104 and an internal diameter corresponding to the external diameter of elongate member 100 is disposed about the diffuser gauze as shown. The nut 51 is then tightened on its associated thread so that the burner body is clamped between the nut and the heat resistant washer 104 to form a gas tight seal with the washer.

In the event of a liquid such as soup being split into the pan support 11 and running into the burner unit 13 and blocking the holes therein it is possible by releasing the nut 51 from the elongate member 100 to dismantle the burner unit to clean it. Once it has been cleaned and dried the parts of the burner can be replaced in the reverse order to which they were dismantled and finally the nut tightened into place to clamp the assembly together again.

FIG. 3 of the drawings shows the stove in its demounted state with the air/gas mixture tube 14 having been screwed into the aperture 101 (FIG. 13) of the burner unit 15, the base member 12 having been inverted and placed over the mixture tube with the castellations 20 interfitting with those of the pan support 11 and with the combined jet and gas supply pipe fitting 15 inserted through a central aperture in the base member and screwed into the mixture tube 14. The fitting 68 and the hose 65 are inserted through one of the apertures in the base member 12 and are stored within the case formed by the pan support 11 and the base member 12. If desired the valve 72, the piercer 85 and the gas container holder 80 can also be placed within this case. It will be appreciated that in its demounted form the various parts of the stove namely the gas jet 62, the air/gas mixture tube 14 and the burner unit 13 are all located within the casing formed by the pan support 11 and the base member 12 and are protected from damage as well as from the ingress of foreign matter. Further by locating the valve 72, the piercer 85 and gas cylinder holder 80 within the casing all the various parts are kept together and since the outside diameter of the pan support and the base member is of the order of 4½ inches then it can be easily placed in the pocket of an anorak or rucksack or in the glove compartment of a car. The liquid gas container is stored separately and in the case of a resealable container the valve 72 can be disconnected from the container 73 and stored in the manner described above. However in the case of a non-resealable container the piercer 85 and the valve 72 are left in position on the holder 80 thereby effectively sealing container 75.

In order to assemble the stove the hose 65 and the fitting 68 are withdrawn from within the case and the fitting 15 is unscrewed from the air/gas mixture tube 14. The base member 12 can then be removed and put to one side. If the piercer 85, valve 72 and holder 80 are within the case these are removed and placed safely to one side. The air/gas mixture tube 14 is then unscrewed from the threaded aperture 101 (FIG. 13) and is screwed into the aperture 102 on the underside of the pan support 11. If necessary the tube 14 can be tightened by placing the hexagon aperture 53 (FIG. 3) over the tube 14 and using the base member 12 as a spanner. The base member 12 is then placed with its dished portion facing away from that of the pan support and the combined jet and gas supply fitting is inserted through the aperture in the base member and is screwed into the underside of the mixture tube 14. Depending on the type of gas container used either the valve 72 is screwed into a resealable container 73 (FIG. 7) and the fitting 68 screwed into the valve or in the case of a non-resealable container the straps 81 of the holder 80 are disposed about the container 75 and the assembly of the valve 72 and the piercer 85 is screwed into the threaded aperture 83 of the bushing 82 of the holder 80 and the container is pierced. Either before or after the container is pierced, the fitting 68 on the hose 65 is screwed into the end of the valve remote from the piercer 85. The stove is then ready for use.

It is preferable to construct all the parts of the stove from a lightweight metallic material such as aluminium or an alloy thereof. However in the case of a stove of small physical dimensions having a pan support of less than 4½ inches (11.5cms) it is considered preferable to make pan support 11 of another material such as stainless steel because the running temperature of the stove can be above the annealing temperature of aluminium. Whilst it is most convenient to form the pan support 11 and the base member 12 so as to have a circular cross-section, other cross-sectional shapes may be used and other forms of castellations, for example with a 45° slope to facilitate interfitting made in the periphery of the pan support.

If desired the holder 80, the piercer 85 and the valve 72 can be made partially or wholly of non-metallic materials such as plastics. Although all the parts of the stove, the valve, the holder and the piercer are connected to each other by threaded connections other suitable means such as bayonet connectors may be used.

As illustrated in the drawings the stove is of a compact construction with a low centre of gravity. Also the downstream end of the gas supply pipe is disposed beneath the central portion of the base member 12 and as a result is generally unaffected by the heat emanating from the pan support 11. Also by making the pan support 11 and base 12 of a generally part spherical shape and of the order of 3½ to 4½ inches (9 to 11½ cms) diameter, then the collapsed stove can conveniently be stored and carried in a pocket or in the glove compartment of a car.

I claim:
1. A camping stove comprising, in combination:
 a. a pan support;
 b. a base member having an aperture;
 c. a burner unit attached to said pan support;
 d. an air/gas mixture tube;
 e. a gas jet fitment extending through said base member aperture;
 f. first co-operating connection means on said air/gas mixture tube and said gas jet fitment clamping said base member between said air/gas mixture tube and gas jet fitment and enabling said mixture tube and said gas jet fitment to be connected together; and
 g. second co-operating connection means on said air/gas mixture tube and said burner unit enabling said mixture tube and said burner unit to be connected together in alternatively arrangeable conditions of said stove parts in which in an assembled condition, said burner unit and said pan support are mounted by said air/gas mixture tube on said base member for supporting and heating an article to be heated, and, in a demounted condition said pan support and said base member together form a closed casing for containing and protecting from damage said gas jet fitment, said air/gas mixture tube and said burner unit, said first and second co-operating connection means enabling said gas jet fitment, said mixture tube and said burner unit to be interconnected with each other and the casing when the stove is demounted to prevent said gas jet fitment and said mixture tube from being displaceable from within the casing.

2. A camping stove comprising, in combination:
 a. a pan support;
 b. a base member having an aperture;
 c. a burner unit attached to said pan support;
 d. an air/gas mixture tube;
 e. an externally threaded gas jet extending through said base member aperture;
 f. an externally threaded portion provided at one end of said air/gas mixture tube and an internally threaded portion provided within the other end of said air/gas mixture tube for connection to said gas jet; and
 g. a first internally threaded, coaxially disposed aperture provided in one end of said burner unit, which first aperture communicates with the interior of the burner unit, and a second internally threaded, coaxially disposed, blind aperture provided in the other end thereof, the threads of said first and second apertures and the external thread of the mixture tube being the same, the components of the stove being alternatively arrangeable in an assembled condition whereby said mixture tube is screwed into and communicates with said first aperture, said burner unit and said pan support being carried by said mixture tube on said base member for supporting and heating an article to be heated, and in a demounted condition in which the pan support and said base member together form a closed casing for containing and protecting from damage said gas jet, said mixture tube and said burner unit, said mixture tube being screwed into said second, blind aperture and the gas jet being retained by the mixture tube to prevent said mixture tube and said gas jet from being displaceable within the casing.

3. A stove according to claim 2, in which the pan support and the base member are generally bowl shaped and of the same shape and size.

4. A stove according to claim 3, in which the peripheries of the pan support and base member are castellated, the size and number of the castellations being such that the peripheries of the pan support and base member interfit with each other when they are placed together in the demounted condition of the stove.

5. A stove according to claim 2, in which the threads of the external and internal threaded portions of the mixture tube are the same.

6. A stove according to claim 2, including a gas supply fitting which has an external thread thereon which corresponds to the internal threaded portion of the mixture tube, the gas jet being mounted in a gas supply fitting and in which the base member has a central aperture therein, which aperture is a clearance fit on the external thread of the gas supply fitting, whereby in the ready-to-use condition of the stove the gas supply fitting is inserted through the central aperture in the base member and is screwed into the mixture tube and in the demounted condition of the stove the base member is orientated so as to form a closed casing with the pan support and the gas supply fitting inserted through the central aperture in the base member and screwed into the mixture tube so that the casing is closed and the parts are prevented from being displaced in the casing.

7. A stove according to claim 6, in which the gas supply fitting includes a tubular stem extending radially from the fitting, the stem being shaped to conform closely to the external surface of the base member.

8. A stove according to claim 6, in which the gas supply fitting includes a tubular stem communicating with the gas jet and a flexible hose connected at one end to the stem.

9. A stove according to claim 8, in which the stem is of metal and the flexible hose comprises neoprene tubing, there being included a silicone rubber sleeve positioned between the stem and the neoprene tubing.

10. A stove according to claim 8, which includes a valve for connection to a disposable liquid gas container, and a connector provided on the other end of the flexible hose for connection to the valve.

11. A stove according to claim 2, in which the gas/air mixture tube has a non-circular cross-section, either or both the pan support and the base member having means engageable with the non-circular cross-section for enabling the gas jet and the mixture tube to be tightened or loosened.

12. A stove according to claim 11, wherein the non-circular cross-section is a regular hexagon.

13. A stove according to claim 2, in which the burner unit is dismantlable from the pan support.

* * * * *